United States Patent

[11] 3,615,308

| [72] | Inventor | John J. Amero |
| | | Shrewsbury, Mass. |
| [21] | Appl. No. | 704,304 |
| [22] | Filed | Feb. 9, 1968 |
| [45] | Patented | Oct. 26, 1971 |
| [73] | Assignee | Norton Company |
| | | Worcester, Mass. |
| | | Continuation-in-part of application Ser. No. 541,115, Apr. 8, 1966, now abandoned. |

[54] CRYSTALLINE ABRASIVE ALUMINA
1 Claim, 3 Drawing Figs.

[52] U.S. Cl. .................................................. 51/309, 51/307
[51] Int. Cl. .................................................. C04b 31/16
[50] Field of Search ................................. 51/295, 298, 307, 309

[56] References Cited
UNITED STATES PATENTS

| 1,263,709 | 4/1918 | Saunders | 51/309.1 |
| 1,528,639 | 3/1925 | Tone | 51/309.1 |
| 2,311,228 | 2/1943 | Heany | 51/309.1 |
| 2,347,687 | 5/1944 | Heany | 51/309.1 |
| 3,450,515 | 6/1969 | Amero | 51/309 |
| 2,360,841 | 10/1944 | Baumann et al. | 51/309.1 |
| 2,369,709 | 2/1945 | Baumann et al. | 51/309.1 |
| 2,725,286 | 11/1955 | Coes | 51/309 |
| 2,961,296 | 11/1960 | Fenerty | 51/309 |
| 3,079,243 | 2/1963 | Ueltz | 51/309 |
| 3,183,071 | 5/1965 | Rue et al. | 51/307 |
| 3,387,957 | 6/1968 | Howard | 51/298 |

*Primary Examiner*—Donald J. Arnold
*Attorney*—Rufus M. Franklin

ABSTRACT: Alpha-alumina abrasive crystals in the form of polygonal plates having a diameter to htickness ratio($a$ axis to $c$ axis) of at least 2 to 1, having a total porosity, excluding pores larger than 50 microns, of at least 8 percent, having a hardness on the face perpendicular to the crystallographic $c$ axis of about 1,600 on the Knoop ($K_{100}$) scale, and having particular utility for precision grinding and coated abrasive applications.

CRYSTALLINE ABRASIVE ALUMINA

This application is a continuation-in-part of application Ser. No. 541,115, now abandoned filed Apr. 8, 1966 by Amero, and also discloses subject matter disclosed in application Ser. No. 674,935, filed Oct. 12, 1967, by Jones and Amero, assigned to the assignee of the instant application of Amero.

BACKGROUND OF THE INVENTION

This invention relates to a novel crystalline abrasive alumina having particular utility for precision grinding and coated abrasive applications.

In copending application Ser. No. 541,115, filed Apr. 8, 1966, by the present inventor, is disclosed a method of producing alpha-alumina crystals at a temperature below the fusion temperature of alpha-alumina. A modification and improvement of that method is disclosed in application Ser. No. 674,935, filed Oct. 12, 1967, by Jones and Amero.

This application relates to the products produced by the methods of the referenced applications. The abrasive differs from prior art crystalline alumina grains particularly in its morphology, porosity, and grinding performance.

DESCRIPTION OF THE INVENTION

SUMMARY

A brief description of the preferred manufacturing process for transforming the basic raw materials into the final alpha alumina crystals is summarized below.

Figure 1:
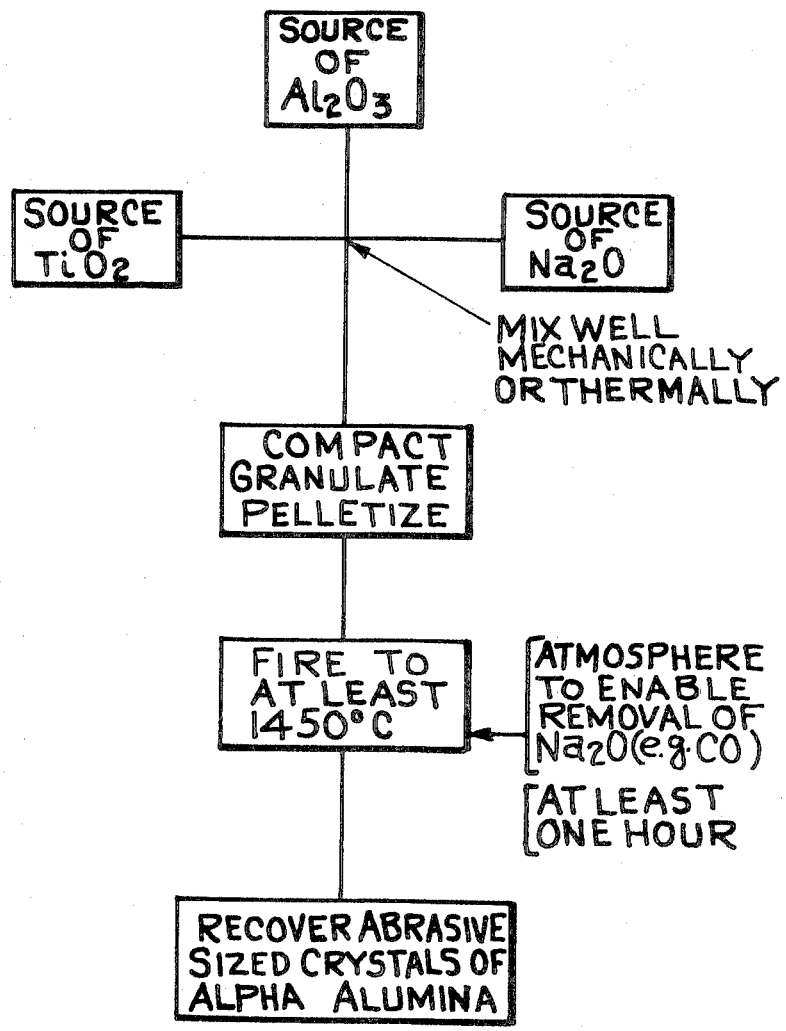

FIG. 1 of the drawing is a flow sheet representing the process in which a source of alumina is mixed with a source of soda and a source of titania, the powder mixture compacted, and fired so that the mixture is exposed to an atmosphere which enables the removal of $Na_2O$ from the mix for a period of at least one hour at a temperature above 1,450° C. After cooling, the product is recovered by chemical or mechanical treatment to free the abrasive crystals from the noncrystalline products.

Figure 2:
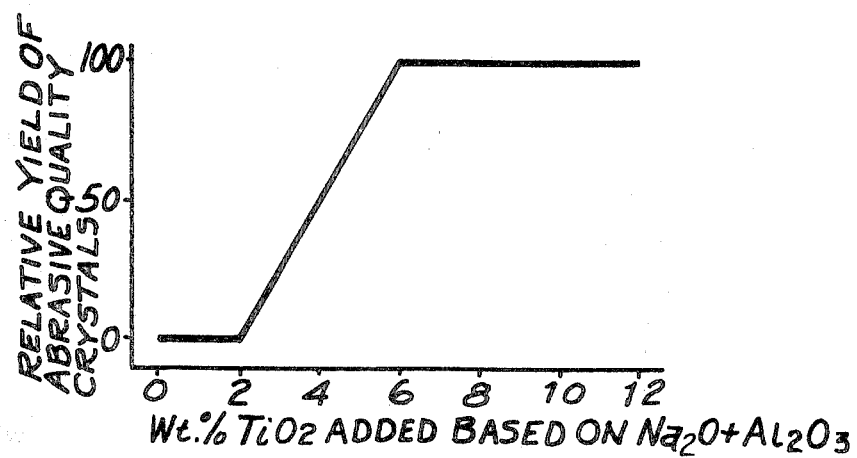

FIG. 2 is a plot showing the effect of titania, $TiO_2$, in the mix. The vertical axis shows the relative yield of abrasive quality product, for fixed firing conditions versus the weight percent titania in the mix. As indicated, no significant effect is produced until the level of titania is higher than 2 percent, based on the weight of soda and alumina. Although not indicated by the plot, increase of titania above 8 percent makes the product more easily separated from the glassy phase nd achieves crystallization under a wider and less critical range of firing conditions.

Figure 3:
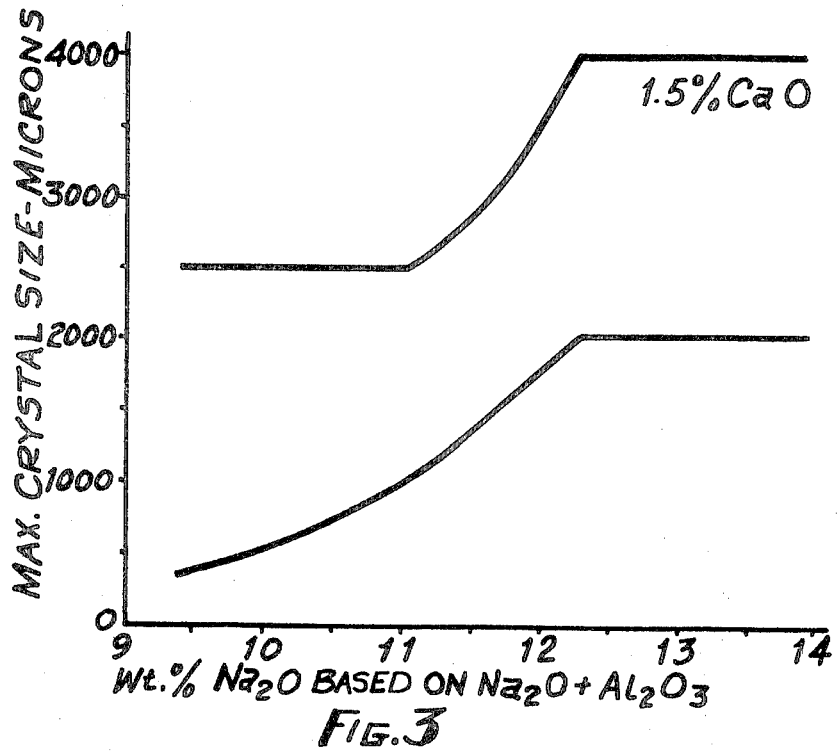

FIG. 3 is a plot showing the effect of the presence of calcium in the reaction mix, and the effect of sodium in the mix. The horizontal axis represents soda content, the vertical axis represents maximum crystal size for a given set of firing conditions, employing a mix containing 10 percent titania. As shown by the data, the presence of CaO at a level of as little as 1.5 percent doubles (or better) the maximum crystal size for all levels of soda content.

The first step is to mix the various ingredients to a homogeneous mixture so that the necessary reactions can occur. The particles of the individual ingredient should be homogeneously dispersed throughout the mixture and the aluminum oxide source crystals should be less than about 20 microns in order that they can be totally reacted within the time and temperature of the process. This homogeneous mixture can be achieved in two ways. Either by thermal mixing or by mechanical mixing. The mechanical mixing is achieved by placing all of the raw materials into a suitable ball mill or rod mill and thoroughly grinding and mixing the materials so that the aluminum oxide crystals of the source material are less than 20 microns. This is a simple commonly used process in the ceramic industry. Thermal mixing is achieved by first briefly mechanical mixing the aluminum oxide source and the sodium oxide source. This mixture is then placed in a suitable kiln and heated to approximately 1,200° C. for about two hours, which allows all the sodium oxide to react with the aluminum oxide forming both beta alumina one sodium oxide to 11 aluminum oxides) and sodium aluminate one sodium oxide molecule to one aluminum oxide). If thermal mixing is done, it is preferable to do so in an oxidizing atmosphere inasmuch as sodium oxide appears to be less volatile under these conditions.

The material is next ingredients into small pellets or granules so that the raw ingredients will be in intimate contact necessary for the final reaction to go to completion and will be exposed to the furnace atmosphere. This can be done by two methods. The raw material can be pressed into cakes and then granulated on a screen to the desired size granules, or the material can be mixed with suitable plasticizers and extruded and dryed into the proper size granules. The maximum granule size is dictated by the mechanism of the removal of sodium into the vapor phase. In other words, thick granules do not allow the proper elimination of sodium oxide, thus, large alpha crystals would not form. The maximum granule size economically useful is approximately one-fourth inches. The shape of the pressed body is not important so long as at least one dimension is about one-fourth inches or less. When the smallest dimension is greater than this, longer times for conversion are required.

The next step in the process is the firing operation. It also appears that a reasonable and economic firing temperature is about 1,500° C. At temperatures less than this, the reaction is slower. At higher temperatures the reaction can be made to go faster. However, we run into uneconomical kiln design and maintenance problems if the temperature is much above 1,700° C. In the temperature range of 1,500° C. to 1,550° C. this reaction can be made to go to completion utilizing one-fourth-inch pellets, in a reasonable time of about 1 hour. Higher temperatures require less time and lower temperatures require more time. The kiln atmosphere surrounding the granules is critical. Very large alpha alumina crystals to the order of 2 centimeters can be produced by heating the mixture in air at 1,550° C. for 100 hours, but we recognize that a 100-hour soak period would not be economical when producing tonnages of this material and such a process is not part of the present invention. Abrasive quality crystals to the order of 2,000 microns can be produced at 1,500° C. in 1 hour provided the proper reducing atmosphere is used. Tests show that a reducing atmosphere accelerates the formation of the crystals at the expense of a reduction in crystal size; inasmuch as 2 centimeter crystals have low use in the abrasive industry, this reduction in crystal is not a serious detriment. The preferred accelerator of the crystallization process is a reducing atmosphere in the form of carbon monoxide. We theorize, without intending to be bound by our theory, that the carbon monoxide reacts with the sodium oxide to form metallic sodium and carbon dioxide. This metallic sodium has a much higher vapor pressure than does the oxide, thus, the vaporization is accelerated. We have also found that the presence of water vapor in the kiln atmosphere also accelerates the process, probably by converting the sodium oxide to sodium hydroxide which in turn has a higher vapor pressure than the oxide. Whatever the mechanism of the removal of sodium from the reaction mix, it is clear that the operative atmospheres cause sodium to react to form a constituent of high vapor pressure which volatilizes from the mix, thus depleting the sodium content of the mix. Successful crystallization has also been achieved by using hydrogen or methane as a reducing atmosphere. We can also achieve reasonable conversion by subjecting the material to the direct impingement of a methane air flame. Inasmuch as an essential of this process is the removal of sodium oxide, it is important that the thickness of the section through which the sodium oxide must permeate must be kept small, that is, we prefer granules having one dimension not to exceed one-fourth inch in order to achieve full conversion at a reasonable time.

When impure raw materials are used such as bauxite and Ilmenite, the excess impurities such as silica, iron and Titania must be disposed of because they do not enter into the alpha alumina crystal in any sizable amounts. As this reaction goes to completion, that is, all of the aluminum oxide is essentially formed into single crystals, the remaining matrix mixture would be depleted in aluminum oxide, thus we would expect it to have a very low melting point. We find this is the case and this low melting point glass then must drain into a blotter material. In order to reduce the amount of impurities that must be removed in this process, it is preferable, but not essential to use as pure raw materials as economics will allow. Our blotter materials preferably consist of a mixture of about 80percent of aluminum oxide and 20percent of a ball clay type material. Pure alumina may be used without any clay admixture.

After the firing cycle has developed large crystals of alpha alumina, the granules may be subjected to a chemical treatment in order to separate the large crystals. First the granules are treated with a strong acid, washed, and then treated with a strong base–e.g. sodium hydroxide After a thorough washing the matrix material still binding the crystals together becomes soft and easily broken down. The granules are then subject to a mild crushing operation so that the crystals are separated. The excess matrix material is then washed from the crystals which after drying are ready to be incorporated within a grinding wheel. When high purity materials are employed such that a minimal matrix material is contained in the product, the crystals can be recovered by a mild crushing without resort to chemical treatment.

A typical alpha alumina crystal produced by this process would be 1,000 to 2,000 microns in diameter by 500 to 1,000 microns thick. This size is approximately equivalent to 8 grit as described in abrasive grain sizes Simplified practice Recommendation 118,50 as published by the U.S. Department of Commerce. The clear crystals have an analysis of 99 percent + aluminum oxide and about 0.2 percent titanium dioxide. In addition, the blue crystals will contain less than 1 percent iron oxide as the colorant. The crystals without iron oxide are basically transparent sapphire. However, must of them have an internal spherical porosity at about 5 volume percent which gives a milky white appearance to the crystal. The mixture with iron oxide has a similar appearance except for a deep blue color would render the thick sections opaque. Occasionally within the internal porosity we can see trapped matrix which has a composition of approximately 10 percent sodium oxide and 35 percent titanium dioxide with the balance being aluminum oxide. In addition to the internal spherical porosity, the shape would be known in abrasive circles as weak shape, with the larger grit sizes tending to be more platy nature. This abrasive can be identified by, (1) the platy nature of the large crystals, (2) by the fairly spherical internal porosity and (3) by the occasional appearance of trapped matrix within the internal pores. This internal porosity and platy nature of the crystal no doubt contributes to the superiority of this abrasive in precision grinding. In all grinding tests to date, this type of crystal has proven itself to be superior to all known types of commercial precision abrasive grain.

An alternative to the preferred method described above for the production of this abrasive is the method described in my prior application Ser. NO. 541,115.

SPECIFIC DETAILS OF THE PROCESS

Raw Materials

The raw materials required are a source of alumina, a source of soda, and a source of Titania.

The alumina may be provided by bauxite, chemically purified bauxite (e.g. Bayer process alumina), sodium aluminate (e.g. beta alumina), or equivalent sources of comparable alumina content.

The soda can be provided by any compound of sodium which will retain sodium in the mix under neutral or oxidizing conditions up to the peak firing temperature employed. Sodium carbonate, sodium sulfate, sodium fluoride, cryolite and sodium aluminate have all been satisfactorily employed in this process. Salts with high vapor pressure or which promote loss of sodium prior to the initiation of crystal growth, such as $NaNO_3$ and NaCl are not suitable. The fluorides are less suitable than the oxide, carbonate, or sulfate.

The Titania may be supplied as elemental titanium, $TiO_2$, rutile, $Ti_2O_3$, or as a titanate. Titanate, $TiO_2$, has been preferred because of its availability. The titanium content is calculated and expressed herein as the equivalent $TiO_2$, Titania, content.

The relative proportions of alumina (A), soda (N), and Titania (T) in the mix are important. The operative amount of sodium corresponds to a soda content (that is, the sodium in whatever form is calculated as an equivalent amount in terms of sodium content of soda, $Na_2O$) of 6 to 12 weight percent. This corresponds to a molecular or mole ratio of alumina to soda (A/N) of from 4 (12 wt. percent soda) to 9 (6 wt. percent soda). The preferred amount of sodium corresponds to a mole ratio A/N of 5.5 or about 10.5 weight percent of soda (all weight percent's in this paragraph being based on alumina plus soda contents, ignoring other ingredients). A serious drop in effectiveness of soda is noted below 8 percent by weight. Thus the preferred range of soda content is 8 to 12 percent by weight, or an A/N mole ratio of 4 to 8.

Titania must be present in a mole ratio A/T (alumina to Titania) of from 4 to 20, corresponding to a 4 to 15 percent by weight content of Titania (based on the Titania and alumina).

Other beneficial additives include lime, CaO, which can be added as calcium carbonate, $CaCo_3$. An addition of 1.5 percent by weight CaO (or the equivalent amount of $CaCO_3$) is effective to produce crystals at least twice as large in the major dimension as are otherwise produced at the same temperature and soak time for a mix not containing calcium or a calcium compound. As little as 0.5 weight percent CaO gives a 50 percent increase in crystal size and no additional benefit is achieved by adding more than 2 percent. At 3 percent the maximum crystal size is the same as that achieved at the 1.5 percent CaO level.

Although it is desirable to keep unnecessary aluminous materials to a minimum to minimize unwanted by products which tend to make recovery of the crystals less economical, impurities at the level found in bauxite are tolerable. Silica, although tolerable in the amounts found in bauxite is undesirable. Magnesia or magnesium compounds are inhibiting to crystallization, as is chromium and, to some extent, iron. Iron, however, is effective in conjunction with Titania to produce a blue color in the crystalline product which may be desirable for certain applications.

Pelletization of the mix may be accomplished by very light pressure. Any pressure sufficient to produce reasonably self-sustaining shapes is sufficient. Higher pressures are not necessary, but may be employed without detriment. A pressure of over 50 p.s.i. is desirable.

Inert materials may be mixed in or with the pellets. For example, carbon in the form of charcoal or coke may be employed to keep pellets separated, as in a gravity fed vertical shaft furnace, a rotary kiln, or a fluidized bed furnace.

Preferred Furnacing Conditions

The variables in the furnacing are the time, temperature, and furnace atmosphere. The lowest temperature at which good results have been achieved in a reasonable time is 1,450° F. It is preferred to operate at 1,500° C. to 1,550° C., although higher temperatures may be employed.

The furnace atmosphere should provide reducing conditions with respect to $Na_2O$. Carbon monoxide, either pure or in admixture with nitrogen or other nonoxidizing gases is operative in the process as is hydrogen or methane, which cracks to provide hydrogen at the temperature involved. The concentration and flow rate of the atmosphere must be sufficient to effect quantitative removal of sodium from the reactant mixture in the chosen soak time, which may vary from 1 to 6 hours. Longer soak times may of course be used, but seriously detract from the economics of the process. Crystallization of alpha alumina does not begin until the soda has been reduced below an A/N ratio of 11.

One method of producing operative reducing conditions is to fire the pellets adjacent the tip of the flame of a gas fired furnace with the air-gas ratio adjusted to produce reducing conditions. A typical mix is a stoichiometric mixture of natural gas and air. Oxygen deficient mixes also, of course, are reducing. For typical natural gas the stoichiometric ratio is 10 volumes of air to 1 volume of gas.

For purposes of illustration and testing a horizontal tube furnace with a controlled atmosphere has been employed. The furnace is heated by resistance heating elements spaced around the outside and parallel to the axis of the tube and various gases and gas mixtures are fed through the tube during a run. The tube has a cross section of 7.07 sq. inches (46 sq. centimeters). A typical charge of mix consists of 25 grams. The heat-up time has not been found critical, and after reaction, the contents may be discharged immediately. Thus, the cooling time has no critical influence on the process.

Illustrative Examples

The following are examples of mixtures of various raw materials which have been successfully employed to produce abrasive sized alpha alumina crystals according to the present invention:

found to be several times more active as CO, and $CH_4$ even more active under the conditions specified. The concentration and flow of reducing gas must be sufficient to remove most of the soda from the mix in 1 to 5 hours at the soak temperature employed. As soon as the soda is reduced to below 5.5 percent by weight (N/A =11.1 ) growth of alpha alumina crystals begins. Thus for reasonable conversion, we can specify that at least 95 percent of the original soda must have been removed from the mix. Stated another way, for optimum mixes, the soda content should have been reduced to 0.5 percent or less at the end of the firing.

The product, upon removal from the furnace is treated with hot 0.1 normal sulfuric acid for 1 hour or more, and then with 20 percent NaOH for 1 hour. With mixes such as 1,508-1, which contain small amounts of impurities, the crystals may be separated mechanically, as by crushing, or with chemical treatment. The chemical treatment is employed to remove excess slag (noncrystalline phase) and any mechanical or chemical treatment to accomplish this end may be employed.

Grinding Performance

A mixture of B-7 , 90 parts, and Titania 10 parts, was pelletized into 16 mesh and coarser granules and fired in a gas kiln, the gas to air ratio by volume being 1 to 10 , with the flame impinging directly on the granules set on an alumina batt, one layer deep. The pellets upon removal after a 5 -hour firing time at 1,550° C. showed excellent crystal development. After cooling the crystals were separated by acid-alkali treatment as previously described and the separated crystals were

TABLE I

| Mix identification | $Al_2O_3$ source | $Na_2O$ source | $TiO_2$ source | Other additives |
|---|---|---|---|---|
| 1508-1 | B-7, 90% | (B-7) | $TiO_2$, 10% | |
| 1508-2 | B-7, 87% | (B-7) | $TiO_2$, 10% | $Fe_2O_3$, 3%. |
| 1508-3 | B-7, 87% | (B-7) | $TiO_2$, 10% | $CaCO_3$, 3%. |
| 1525 | Bayer alumina (A-2), 80% | $Na_2CO_3$, 17% | $TiO_2$, 10% | |
| 1564-1 | Bayer alumina (A-2), 81% | $Na_2CO_3$, 16% | $TiO_2$, 10% | |
| 1564-2 | Bayer alumina (A-2), 78% | $Na_2CO_3$, 16% | $TiO_2$, 10% | $Fe_2O_3$, 3%, $CaCO_3$, 3%. |
| 1570 | Bayer alumina (A-2), 78% | $Na_2CO_3$, 16% | $TiO_2$, 10% | $Cr_2O_3$, 3%, $CaCO_3$, 3%. |
| D-20-1 | B-7, 79% | (B-7) | $FeTiO_3$, 4% | |
| D-20-2 | B-7, 79% | (B-7) | $FeTiO_3$, 6% | |
| D-20-3 | B-7, 79% | (B-7) | $FeTiO_3$, 6% | |
| D-20-5 | B-7, 79% | (B-7) | $FeTiO_3$, 8% | |
| D-21 | B-7, 79% | (B-7) | $FeTiO_3$, 12% | |
| D-20-6 | B-7, 79% | (B-7) | $TiO_2$, 6% | |
| D-26-1 | B-7, 79 parts | (B-7) | $Ti_2O_3$, 6% | |
| D-26-2 | B-7, 79 parts | (B-7) | $TiO_2$, 9 parts | $Cr_2O_3$, 3 parts. |
| D-26-3 | B-7, 79 parts | (B-7) | $TiO_2$, 9 parts | $V_2O_5$, 3 parts. |
| D-26-4 | B-7, 79 parts | (B-7) | $TiO_2$, 9 parts | CaO, 3 parts. |
| D-26-5 | B-7, 79 parts | (B-7) | $TiO_2$, 9 parts | MnO, 3 parts. |
| D-73 | B-7, 89% | (B-7) | $TiO_2$, 9 parts | NiO, 3 parts. |
| 52-F | Surinam bauxite, 79% | $Na_2SO_4$, 19% | Ti, 6% | |
| 53-N | Surinam bauxite, 82% | $Na_2CO_3$, 16% | $TiO_2$, 2% | Typical impurities of bauxite (calcined). |
| 65-E(M) | Bayer alumina, 70 parts | NaF, 9 parts | $TiO_2$, 8 parts | |
| 43-S | Surinam bauxite, 50% | $Na_3AlF_6$, 25% | Ilmenite, 25% | |
| T-1 | Bayer alumina, 78% | $Na_2O$, 12% | $TiO_2$, 10% | |
| T-2 | B-7, 87% | (B-7) | $TiO_2$, 10% | |
| T-3 | B-7, 83% | (B-7) | $TiO_2$, 10% | $CaCO_3$, 3%. |
| T-4 | $Al_2O_3$, 86% | $Na_2TiO_3$, 14%* | $TiO_2$, 9% ($Na_2TiO_3$) | $CaCO_3$, 6%. |

*A Mixture of $Na_2O$ and $Na_2Ti_3O_7$ in the mole ratio of 2 to 1.

In the above Table, B-7 designates an alumina-soda composition consisting of 82 percent Bayer process alumina (A-2 alumina from Aluminum Company of America and 18 percent sodium carbonate mixed and fired for two hours at 1,400° C. The product is essentially beta alumina ($Na_2O \cdot 11 Al_2O_3$) And sodium aluminate (1:1 ). The analysis of the B-7 is 9.5% $Na_2O$ and 90 percent $Al_2O_3$. Sodium sulfate may be used in place of the sodium carbonate to produce B-7 . Before use the material is milled to reduce the particle size to 20 microns or less.

The above mixes all give good quantitative production of alpha-alumina crystals within 1 –6 hours in an atmosphere of CO or nitrogen and CO. Typical furnacing conditions for the tube described above are 200 cc. per minute of CO mixed with 3 liters of nitrogen which is preferably wet by passing through water prior to injection into the furnace. The mix, in the form of granules or pellets, less than one-fourth inch in size are spread in a thin layer on a batt ( such as alumina) and held at from 1,450° to 1,700° for from 1 to 6 hours, the higher temperatures requiring less time. Hydrogen or methane may be substituted for CO, but lower flow rates should be employed to prevent over-reduction of the mix or even reduction of the structural materials of the furnace itself. Hydrogen has been screened. Useful yield in the range of from 12 to 100 grit was obtained. Abrasive grain such as produced above was made into grinding wheels in 46 grit and 60 grit sizes using a standard vitrified bond. The wheels were 7 ½ inches in diameter and one-half inch thick and conformed to the standard Norton Company specification J (grade) 8 (structure). In grinding a typical steel under standardized conditions the product outperformed a commercial high purity fused aluminum oxide abrasive. The ratio of volume of metal removed per volume of wheel wear was from 22 to 36 percent higher for the abrasive of this invention.

The shape of the abrasive of this invention is particularly suitable for the manufacture of coated abrasives. In a comparison of resin bonded coated abrasive fiber discs, using standard 30 grit abrasive and 30 grit abrasive of this invention the percent cut of 1,020 steel was 28 percent higher for the abrasive grain of the present invention.

Description of Grain

Abrasive grain of my invention produced according to the nonfusion growth process exhibits unique properties which distinguish it from alpha alumina produced by other methods.

1. Morphology

The abrasive grains of my invention are single crystals in the range of grit size 8 to grit size 320. They are in the shape of flat polygonal discs having the flat faces parallel to the $a$ crystal axis, and the sides parallel or at an angle to the $c$ crystal axis. One result of this orientation of the abrasive grains is that the flat faces have a hardness of about 1,600 on the Knoop scale, while the side faces have a hardness of about 2,200 on the Knoop scale. The diameter of the flat face is at least twice the thickness of the crystal.

2. Porosity

The crystals include spherical porosity from 40 microns in diameter to submicron sizes. The volume percent of porosity in the crystals of 50 micron size and less averages about 10 percent, with a minimum value of about 8 percent porosity. From 40 to 60 percent of the porosity is internal, closed, porosity, while the remainder is open porosity accessible from the surface of the grain. Porosity measurements can be obtained by standard pycnometric methods and by the mercury porosimeter.

3. Chemistry

The product is at least 95 percent $Al_2O_3$, with some slag inclusions, but with a higher content of solid solution iron and titanium than conventional fused abrasives, as indicated by significant $d$ spacing shifts or determined by powder X-ray diffraction results.

Examples

Example A

The crystals produced according to the method described above in mix 1,508-1 (Table I) were found to have a total porosity of 10 percent by volume ($\pm 2\%$), and an average diameter to thickness ratio of 2.5 to 1. About one-half of the pores were closed pores. For 46 grit abrasive the weight per grain was 0.092 mg. as compared to a blocky fused abrasive with a weight of 0.146 mg. per grain (average).

The wet chemical analysis of the crystals, excluding any slag was:

| | |
|---|---|
| $TiO_2$ | 0.32 wt. % |
| $Fe_2O_3$ | 0.05 |
| $Na_2O$ | <0.05 |
| $SiO_2$ | <0.05 |
| CaO | not determined |
| $Al_2O_3$ (by Difference) | 99.5 |

The X-ray diffraction data showed abnormally high solid solution titania, as compared to fused abrasives, and this is confirmed by the above analysis.

Example B

Crystals were made from the mix identified as 1,508-2 in Table I. The porosity was also $10 \pm 2\%$ (total) with about one-half the porosity being closed pores.

The diameter to thickness average was 3.5 to 1, and 46 grit grains weighted 0.090 mg. as compared to 0.146 mg. for the fused blocky grains.

The wet chemical analysis of the crystals, excluding slag (by severe leaching), was:

| | |
|---|---|
| $TiO_2$ | 0.28 wt. % |
| $Fe_2O_3$ | 0.70 |
| $Na_2O$ | <0.05 |
| $SiO_2$ | <0.05 |
| CaO | not determined |

This material was very high in solid solution iron, confirming the X-ray diffraction results referred to above. This degree of iron in solid solution has not been observed in fused alumina crystals.

Example C

Crystals were prepared from the mix identified as T-2 in Table I.

The results on porosity were as in Examples A and B. The diameter to thickness ratio was 2 to 1, and the grains were significantly lighter than equal grit sized grains of the fused comparison material.

The wet chemical analysis, exclusive of all but about 1 percent of slag (by visual estimate), was:

| | |
|---|---|
| $SiO_2$ | <0.05 wt. % |
| $Fe_2O_3$ | 0.16 |
| $TiO_2$ | 0.64 |
| $Na_2O$ | <0.05 |
| CaO | not determined |

Example D

Alumina crystals were prepared as in Example I of Ser. NO. 541,115. The porosity in this material was similar to that in examples for A, B, and C. The diameter to thickness ratio was 3.4 to 1 and the weight per grain for 46 grit was about 0.090 mg. Chemical analysis indicated a level of solid solution Titania and iron twice as great as in fused crystals. Grinding tests, as with the other examples, showed about a 25 percent improvement in grinding ratio, when bonded into vitrified wheels, as compared to the best performing conventional fused abrasives for precision type grinding.

The abrasives of all the examples showed a significantly greater friability of the crystals as compared to fused abrasive alumina crystals and all averaged less than 0.12 mg. in the 46 grit size.

What is claimed is:

1. Nonfused sized alpha-alumina single crystals grit size 8 to 320 having a polygonal disc shape consisting of at least 95 percent by weight alumina with a diameter to thickness ratio of at least 2:1, with the crystallographic $c$ axis perpendicular to the disc diameter, containing iron or Titania or both in solid solution, weighing less than 0.12 mg. in the 46 grit size, having a total porosity of 50 microns and smaller of 8 to 10 percent by volume, and having a higher friability than fused alumina crystals.

* * * * *

UNITED STATES PATENT OFFICE
CERTIFICATE OF CORRECTION

Patent No. 3,615,308　　　　　　　Dated October 26, 1971

Inventor(s) John J. Amero

It is certified that error appears in the above-identified patent and that said Letters Patent are hereby corrected as shown below:

Column 2, line 8, "ingredients" should read -- formed --. Claim 1, line 1, after "Nonfused", insert -- abrasive --.

Signed and sealed this 17th day of October 1972.

(SEAL)
Attest:

EDWARD M. FLETCHER, JR.　　　　　　ROBERT GOTTSCHALK
Attesting Officer　　　　　　　　　Commissioner of Patents